Feb. 2, 1954 L. J. B. R. FRENCH 2,667,979
APPARATUS FOR FEEDING BOOKS AND THE LIKE BODIES
IN SUCCESSION FROM A STACK OR TIER THEREOF
Filed Sept. 30, 1948 5 Sheets-Sheet 4

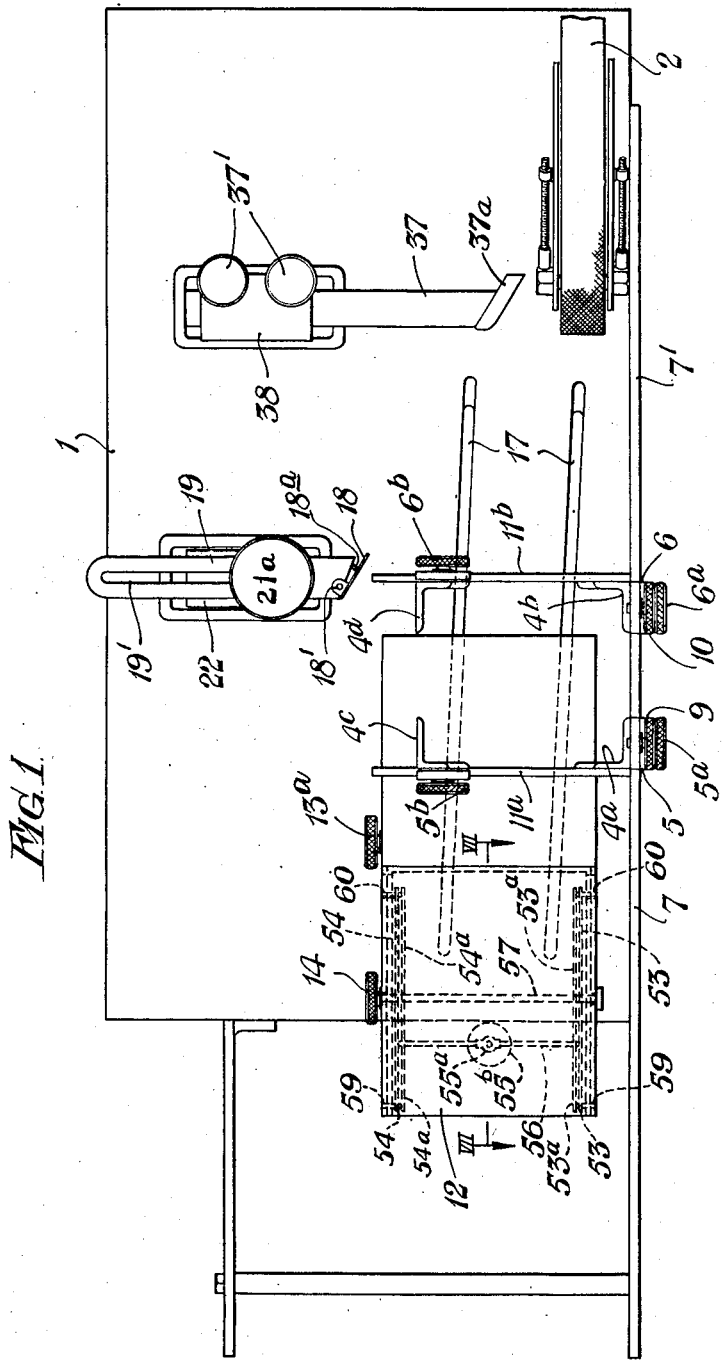

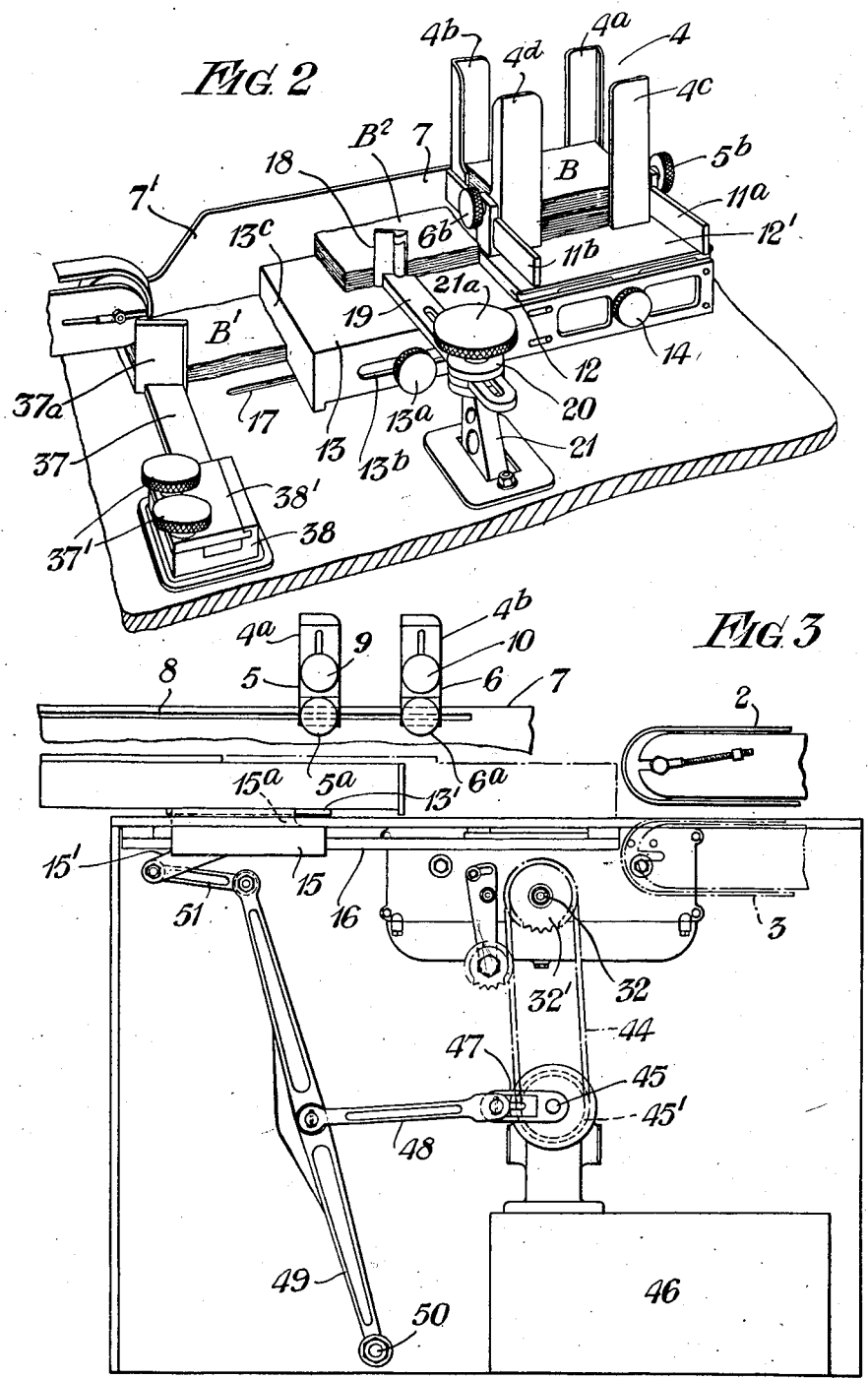

Inventor
LIONEL J.B.R. FRENCH.
By:
Haseltine Lake & Co.,
AGENTS

Feb. 2, 1954 L. J. B. R. FRENCH 2,667,979
APPARATUS FOR FEEDING BOOKS AND THE LIKE BODIES
IN SUCCESSION FROM A STACK OR TIER THEREOF
Filed Sept. 30, 1948 5 Sheets-Sheet 5

INVENTOR
LIONEL J. B. R. FRENCH
By:
Haseltine, Lake & Co.
AGENTS

Patented Feb. 2, 1954

2,667,979

UNITED STATES PATENT OFFICE 2,667,979

APPARATUS FOR FEEDING BOOKS AND THE LIKE BODIES IN SUCCESSION FROM A STACK OR TIER THEREOF

Lionel John Bryant Rushent French, London, England, assignor to The Book Machinery Company Limited, London, England, a British company Application September 30, 1948, Serial No. 52,064

Claims priority, application Great Britain October 2, 1947

10 Claims. (Cl. 214—8.5)

The purpose of this invention is to provide an improved means for feeding books when they are to undergo one or more phases of mechanised processing and where it is essential or desirable that they shall be fed rapidly and accurately into the machine or conveying device with the minimum demand for speed and dexterity from the operator. While applicable primarily to bookbinding the invention would be of equal use for other purposes than bookbinding where it is appropriate to have a rapid and accurate feeding of bodies in succession from a tier or stack of such bodies. However, an apt use of the present invention is for the feeding of books in their sewn condition into a machine which will glue up their backs and complete the lining. In this connection, as in their sewn condition, the books are only loosely held by the thread and it is essential that when thrust into the machine the head and back of the books are square and even with front and off surfaces. The desired evenness and squareness is usually obtained by rapping the head and back sharply on a flat surface and is known in the trade as "knocking up." The machine which glues up and lines the books may contain a conveyor consisting of two superimposed flat belts between which the books are thrust in succession and carried through the machine passing in their passage devices which carry out the glueing and lining. The invention which is the subject of this application would, when applied to the bookbinding art, generally be attached to, or formed integral with, the input end of the glueing and lining machine.

According to the present invention, apparatus for feeding books or like bodies from a supply source to a gluing and lining or other appropriate stage, comprises a table with a hopper adapted to accommodate a stack of books or the like work, means to adjust the hopper to accommodate different dimensions of the work, a conveyor with the table spaced in advance of the hopper, a thrust head member reciprocating along the table top beneath the hopper towards and away from the conveyor, a relatively raised feed head carried by one end of said thrust head and having an upper surface which in the forward position of the thrust head is beneath the hopper to support the stack of books and at the retracted or rear position of the thrust head is positioned in rear of the hopper with the relatively lower part of the thrust head beneath the hopper so that the lowermost book drops on to the thrust head, an abutment displaceable translatively across the thrust head member in advance of the feed head and adapted to engage in succession the workpieces delivered into the forward part of the thrust head to prevent their return towards the hopper with the thrust head whereby the workpieces are caused to drop on to the table upon retraction of the thrust head, a "knock-up" gauge member displaceable translatively across the table between the thrust head member and the conveyor and adapted to "knock-up" the work into alignment with the conveyor, and means to adjust the operative terminal positions of the said displaceable abutment and said "knock-up" member to allow for different dimensions of work.

In order that the invention may be clearly understood and readily carried into effect, drawings are appended hereto illustrating one embodiment thereof, and wherein:

Figure 1 is a plan view of the machine;

Figure 2 is a broken perspective view showing a book about to be fed into the conveyor;

Figure 3 is a broken side elevational view showing the mechanism for operating the thrust head;

Figure 4:
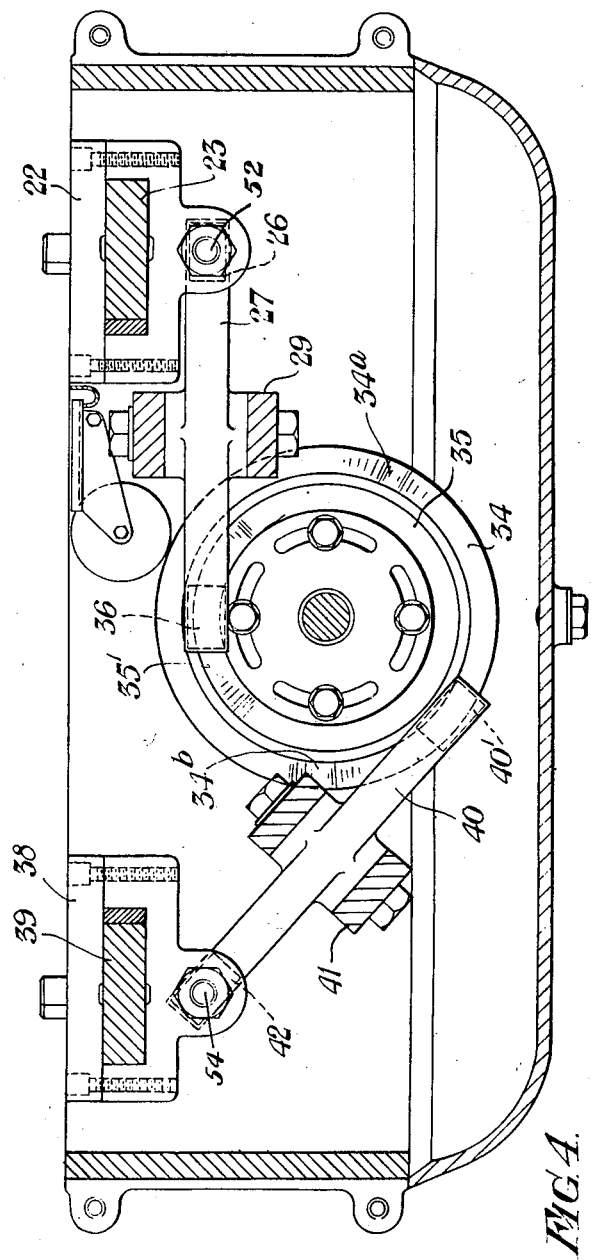
Figure 4 is a sectional side elevation on the line IV—IV of Figure 5 which is a plan view showing the mechanism for actuating the means for knocking-up the work and for preventing its return with the thrust head from the conveyor.

Referring to the drawings, a table 1 is provided at one end with a parallel pair of endless belts 2 and 3 having opposed parallel tracks for conveying partly finished books to a suitable treating station, the lower belt 3 having its upper track co-planar with the table top as shown in Figure 3. Near the other end of the table is a hopper, indicated in Figure 2 generally by the reference numeral 4, adjustable to accommodate itself to various dimensions of books B, provided of course that all of the books arranged within the hopper at any given stage are approximately identical in dimensions. This hopper can comprise four parallel angle section vertical posts, two of which (4a and 4b) are carried by two brackets 5 and 6 (see Figure 3) clamped to a guide rail 7 by a pair of screws 5a and 6a threaded through the outwardly cranked or stepped lower parts of the brackets and engaged in a groove 8 in the side rail 7 to enable the posts 4a and 4b to be adjusted individually along the guide rail, the posts 4a and 4b abutting against the inner face of the guide rail 7 and secured to the brackets 5 and 6 adjustably vertically by screws 9 and 10. These two posts have fixedly secured to them a parallel pair of guide bars 11a and 11b along which are adjustably clamped by screws 5b and 6b two other angle section posts 4c and 4d respectively. By this means the four-poster hopper can be adjusted to suit various sizes of books.

Figure 7:
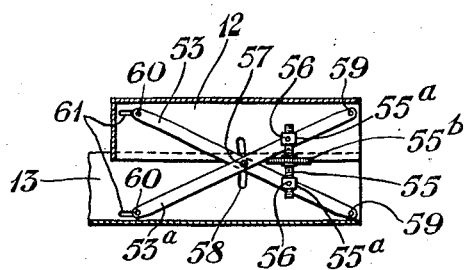
Figure 7 is a section on the line VII—VII of Figure 1.

When the machine is being prepared for use the hopper 4 is adjusted to the desired size of book, and the stack of books is placed therein with the lowermost books engaging a horizontal plate-like base member $12^1$ comprising the top of a feed head 12 adjustable to within fine limits up and down relative to a thrust head box 13 with which it moves as a unit. Means for adjusting the feed head 12 relative to the thrust box 13 is locked in selected position by a knurled headed nut 14. This means can comprise two identical pairs of links 53, 53a on one side and 54, 54a on the other side (see Figures 1 and 7) both arranged X fashion inside the box 13 beneath the feed head and actuated by a worm 55 with oppositely threaded ends engaged in nuts 55a on two rods 56 secured across the links so that the links can be opened out about a pivot pin 57 at their point of intersection to raise the feed head and collapsed to lower the head 12. The worm 55 carries a relatively fixed knurled disc 55b for operating it. Thus, the feed head can be set to have a very slight clearance beneath the hopper, which will be adjusted to leave sufficient space between it and the top of the thrust head box 13 to enable the unbound books B to be fed magazine-fashion in succession from the hopper by reciprocation of the thrust box 13 along the top of the table. The knurled headed nut 14 is threaded on to the pivot pin 57 which passes through arcuate slots 58 in the head 12 and the box 13 during adjustment of the feed head 12 to follow the arc of travel of the axis of intersection of the X links constituted by such pin. At one end the links are pivoted to fixed pivot pins 59 and at the other end carry pins 60 which engage in longitudinal slots 61 in the head and box. Thus, the trailing part of this thrust head box, during a book feeding motion, comprises a horizontal plate-like element (i. e. member $12^1$) which is stepped above the leading part of the box 13 so that the front end of the feed head 12 of the box forms an abutment adapted when the thrust head box is urged forwardly towards the aforesaid conveyors to carry away from the hopper the lowermost book. Beneath the table there is provided a reciprocating slide 15 (see Fig. 3) guided along a rail 16 supported below and by the table top, the slide 15 having neck parts 15a carrying a body $13^1$ to which the box 13 is secured by a screw having a knurled head 13a passed through a slot 13b in the inner side wall of the box 13 to enable the leading end 13c of the box which pushes the books into the conveyor to be set to the desired relationship to the conveyor and work. The box 13 is guided along two parallel slots 17 in the table top.

The thrust head box 13 when urged towards the pair of conveyors has imparted to it a slight lateral displacement during its sliding movement, and for this purpose the parallel pair of guide slots 17 and the rail 16 are inclined at a small angle relatively to the longitudinal edges of the table top as shown in Figure 1.

In Figure 2, the box 13 is seen nearly at the end of its forward stroke urging a book $B^1$ into the conveyors 2 and 3 by the pressure of the forward edge of the box against the trailing end of the book, and at this stage an abutment in the form of a spring loaded blade 18 engages the adjacent side (e. g. head or foot) of the appropriate book $B^2$ in the top of the box 13 and prevents the return of this book with the thrust head box 13. This blade abutment 18 is pivoted at 18' to one end of a book-retaining arm 19 adjustable longitudinally through the cylindrical head assembly 20 of a post 21 the head 20 being adjustable about its vertical axis and fixed in position by a nut 21a screwed on to an upstanding screw on the post 21 and passing through a slot 19' in the arm 19. A spring 18a urges the free end of the blade outwards. By this means the direction of this arm 19 across the table and its effective length can be adjusted to take care of variations in width and length of the books being handled by the machine, it being understood that the loaded blade 18 acts as a pawl with its free end directed towards the conveyor end of the table to enable the book edges to slide freely along the leaf spring in the feeding direction.

Figure 5:
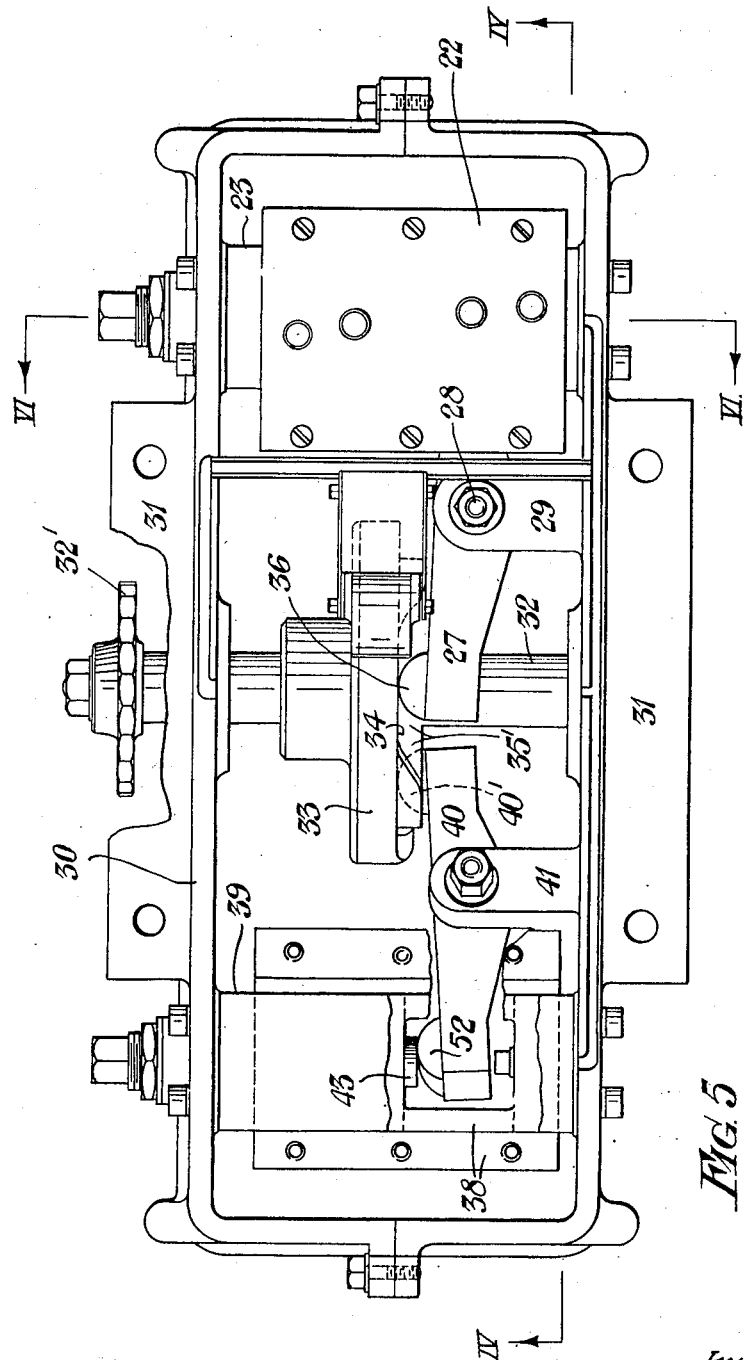
Figure 6:
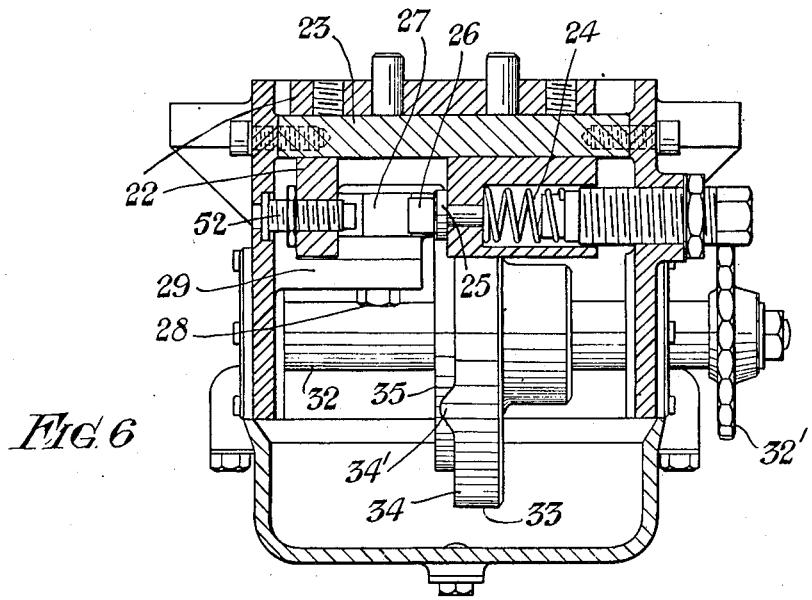
Figure 6 is a section on the line VI—VI of Figure 5.

When the thrust head box is retracted the book $B^2$ will drop on to the table and thus become the book $B^1$. However, in order to obviate the said spring loaded blade 18, by reason of its drag on the book edge, causing deformation of the sheets of the book, the blade 18 is retracted from the book just as the book is about to drop on to the table. This is effected automatically by any suitable means e. g. by mounting the aforesaid post 21 on a split block 22 (see Figures 4, 5 and 6) reciprocating on a transverse guide rail 23 beneath the table, a coiled spring 24 urging the block in the direction away from the books, the said sliding block having a thrust or bearing pin 25 at one end engaged by a raised pad or lug 26 on one end of a rocker arm 27 pivoted between its ends on a bolt 28 carried by a lug 29 formed on one wall of a housing 30 secured by studs passed through flanges 31 to the underside of the table.

The housing 30 has supported in journal bearings in its walls a shaft 32 carrying a cam disc 33 having two concentric tracks 34 and 35. The inner track 35 contains a dwell portion and a return or recessed portion 35' engaging the pad or lug 36 on the end of the rocker arm 27 remote from the pad 26. The dwell portion occupies about 270° of the annular track and urges and maintains the block 22 against the influence of the spring 24, and thus keeps the blade 18 pressed against the side of the book $B^2$ over the required period, the recessed part 35' allowing the spring 24 to return the blade from the work.

It is necessary to tamp or press the leading edge of each book at its appropriate corner across the table against a back gauge located along one longitudinal edge of the table close to the aforesaid conveyors, e. g. a prolongation 7' of the side rail 7, in order that the books will enter the conveyors 2 and 3 in a train with their edges parallel with each other and their lateral edges, i. e. the edges parallel with the conveyor belts in alignment with each other. For this purpose there is provided beyond the book-retaining device 18 aforesaid, an adjustable gauge adapted to engage a leading corner of each book. This gauge takes the form of a cross head 37a disposed diagonally across one end of a bar 37 adjustable translatively across the table transversely to the direction of travel of the books, this bar being supported adjustably linearly in a further split block 38 (similar to the block 22) and also reciprocated along a guide rail 39 in the housing 30 in the same manner as the aforesaid block 22, i. e. by engaging the outer annular track 34 with the pad 40' on one end of a rocker arm 40 supported by a lug 41 in the housing 30 and engaged by a radiused lug or pad 42 at its other end with a thrust pin 43 (see Figure 5) in the block 38. The annular track 34 is formed with two cam parts 34a and 34b to produce the desired movements to the rocker arm 40.

Threaded into the ends of the blocks 22 and 38 are a pair of tappet or stop screws 52 adapted to set the positions of the rocker arms for engagement with the cams. The said bar 37 is adapted to be set relatively to its block 38 by screws 37' and clamping plate 38' (see Figure 2) in order to ensure that when the forward edge of the appropriate book B¹ comes into contact with the said cross head 37a the book would be thrown sharply against the aforesaid back gauge 7'. Thus, each book is properly knocked up before it is thrust into the conveyor, and the said cross head 37a is withdrawn from the path of travel of the book when the book is urged forwardly into the conveyor. Also, the book has an additional "knock-up" applied to it as it enters the conveyor belts 2 and 3 to align it properly in the conveyor and this is effected by repeating the knock-up movement aforesaid by providing the cam 35a for one knock-up, and the cam 35b for the other knock-up.

The shaft 32 is driven by a chain 4 (see Figure 3) passed over a sprocket 32' on the shaft 32 and over a sprocket 45' on a shaft 45 driven from a motor 46 or an output member of a transmission gear. The shaft 45 carries a crank 47 for operating the slide 15 and to which is connected adjustably a connecting rod 48 driving a swinging beam 49 pivoted at its lower end to a fixed fulcrum member 50, and at its upper end to a link 51 pivoted to a bracket 15' on the slide 15.

The axes of the shaft 45 and fulcrum member 50 are normal to the direction of the guide rail 16 which is parallel with the slots 17 to ensure a proper plane of movement for the beam 49.

It will be appreciated from the foregoing that the leading edge or wall of the feed head 12 acts as the abutment which engages the lowermost book supported upon the front end of the thrust head box carrying the book forwardly. Upon return of the thrust head box the feed head 12 will pass freely under the stack of books in the hopper 4 until the lowermost book falls upon the lower or front end of the thrust head box, whereupon the cycle of operations is repeated, the leading end 13c of the thrust head box serving to urge the appropriate book forwardly between the conveyor belts 2 and 3. This cycle of operations will be continuous, and as one book is being thrust into the conveyor of the gluing and lining machine, another is being thrust from the hopper, leaving the books remaining in the hopper free to drop on to the raised feed head 12 of the thrust head box, the lowermost books being the next in sequence to drop on to the forward or relatively lower portion of the thrust head box.

It will be seen that the device described allows books to be fed in quantity at a comparatively slow rate although singly they are being fed into the gluing and lining machine at a speed very considerably higher than could be attained by normal hand feeding. Furthermore, the mechanical knock-up imparted to the books is constant and superior to that obtained normally. The setting and adjustment of the device is simple and quick, a book of the batch to be processed being used to set the hopper to size and the height of the feed head 12, the feed being adjustable up and down relatively to its base, e. g. by the aforesaid intersecting links connected across slotted parts of the top plate and base and actuated by a double-ended screw. The hook is then placed against the leading end 13c of the thrust head box 13 for adjustment of the position of the box 13 relative to the support 13'.

I claim:

1. Apparatus for feeding books or like bodies from a supply source to a glueing and lining or other appropriate treatment station, comprising a table with a hopper adapted to accommodate a stack of books or the like work, means to adjust the hopper to accommodate different dimensions of the work, a conveyor with the table spaced in advance of the hopper, a thrust head member reciprocating along the table top beneath the hopper towards and away from the conveyor, a relatively raised feed head carried by one end of said thrust head and having an upper surface which in the forward position of the thrust head is beneath the hopper to support the stack of books and at the retracted or rear position of the thrust head is positioned in rear of the hopper with the relatively lower part of the thrust head beneath the hopper so that the lowermost book drops on to the thrust head, an abutment displaceable translatively across the thrust head member in advance of the feed head and adapted to engage in succession the work-pieces delivered into the forward part of the thrust head to prevent their return towards the hopper with the thrust head whereby the workpieces are caused to drop on to the table upon retraction of the thrust head, a "knock-up" gauge member displaceable translatively across the table between the thrust head member and the conveyor and adapted to "knock-up" the work into alignment with the conveyor, and means to adjust the operative terminal positions of the said displaceable abutment and said "knock-up" member to allow for different dimensions of work, including a guide for the work at the entry end of the conveyor, means to operate said "knock-up" member in synchronism with the work feeding means to "knock-up" the work against the said guide and also to "knock-up" the work against its trailing edge as it enters the conveyor, the said gauge member for knocking-up the work and the abutment for preventing the work on the thrust head from being carried away from the conveyor comprising a pair of arms extending across the top of the table, a head carried at one end of each arm to engage the work, supports for said arms, means to adjust said arms lengthwise through said supports, and means provided with said supports to fix the arms relatively thereto, openings in the table top through which said supports project, carrier members for said supports, guides beneath the table top in which said carrier members slide, a prime mover, a rotary cam member driven from said prime mover, a pair of rocker arms through the medium of which said cam member actuates said slidable carrier members, and spring means yieldingly opposing said pair of rocker arms and maintaining operative connection between the said support members and the rocker arms.

2. Apparatus for feeding bundles of sheets forming books from a supply source to a binding, gluing, lining or other treatment station appropriate to book binding, comprising a table with a hopper disposed above the table to accommodate a stack of books, means to adjust the hopper to accommodate different dimensions of the work, a work conveyor with the table spaced in advance of the hopper, a thrust head member with an upper work supporting surface, means to reciprocate such thrust head member endwise along the table top towards and away from said conveyor and disposed beneath the hopper, a relatively raised and normally relatively fixed feed head carried by the end of said thrust head remote from the conveyor and having an upper surface which, in the forward position of the thrust head, is beneath the hopper to act as a support for the stack of books and at the retracted or rear position of the thrust head is positioned in rear of the hopper with the thrust head member beneath the hopper so that the lowermost book drops on to the said upper surface of the thrust head member, a fixed longitudinal abutment member disposed close alongside one longitudinal side of the thrust head member, a work engaging abutment, means to reciprocate said work engaging abutment towards and away from said longitudinal abutment in timed relationship with the reciprocation of the thrust head member, said reciprocating abutment being positioned to traverse transversely across the upper surface of the thrust head member in advance of the feed head and adapted to engage in succession one side of the successive books supported on the said upper surface of the thrust head to press the books against said longitudinal abutment member while the thrust head member is in advance of the hopper to prevent the return of the books towards the hopper with the thrust head member whereby the books are caused to drop on to the table upon retraction of the thrust head member, a work squaring gauge member disposed close to the table top between said conveyor and the front terminal position of movement of the said thrust head member, means to actuate said work squaring member in timed sequence with the movements of the thrust head towards and away from the said abutment wall member so that the work squaring member squares the books delivered from the thrust head against said abutment wall member in close proximity to said work conveyor, and means to adjust the operative terminal positions of the said displaceable abutment and said work squaring member to allow for different dimensions of work.

3. Apparatus as claimed in claim 2 including means imparting to said thrust head member lateral movements towards and away from said fixed longitudinal abutment member simultaneously with its fore and aft movements respectively.

4. Apparatus as claimed in claim 2 including means to adjust the said feed head vertically relative to the thrust head to provide for different thicknesses of work, said feed head and said thrust heads having vertical faces to engage the trailing edges of the work when the work is located on the thrust head and on the table respectively, the said vertical faces being the leading faces when the thrust head is moving towards the conveyor.

5. Apparatus for feeding books or like bodies from a supply source to a gluing and lining or other appropriate treatment station, comprising a table with a hopper adapted to accommodate a stack of books or the like work, means to adjust the hopper to accommodate different dimensions of the work, a conveyor with the table spaced in advance of the hopper, means reciprocating said thrust head member along the table top beneath the hopper towards and away from the conveyor, a relatively raised feed head carried by one end of said thrust head and having an upper surface which in the forward position of the thrust head is beneath the hopper to support the stack of books and at the retracted or rear position of the thrust head is positioned in rear of the hopper with the relatively lower part of the thrust head beneath the hopper so that the lowermost book drops on to the thrust head, opposed work engaging abutments, means displacing one of said abutments transversely across the thrust head member in advance of the feed head and adapted to engage in succession the work-pieces delivered into the forward part of the thrust head to prevent their return towards the hopper with the thrust head whereby the work pieces are caused to drop on to the table upon retraction of the thrust head, a work squaring member, means to displace said work squaring member translatively across the table between the thrust head member and the conveyor, said work squaring member squaring the work delivered from the thrst head member close to and in alignment with the conveyor, mechanism timing the work squaring movements of said work squaring member to square the work and engage the trailing edge of the work as it enters the conveyor successively, the said work squaring member and the said displaceable abutment for preventing the work on the thrust head from being carried away from the conveyor comprising a pair of arms extending across the top of the table, a head carried at one end of each arm to engage the work, supports for said arms connected to the said means for displacing the work squaring member and displaceable abutment, means to adjust said arms lengthwise through said supports to allow for different widths of work, and means provided with said supports to fix the arms relatively thereto.

6. Apparatus as described in claim 5 including openings in the table top through which said supports project, carrier members for said supports, guides beneath the table top in which said carrier members slide, a prime mover, a rotary cam member driven from said prime mover, a pair of rocker arms through the medium of which said cam member actuates said slidable carrier members, and spring means yieldingly opposing said pair of rocker arms and maintaining operative connection between the said support members and the rocker arms.

7. Apparatus as claimed in claim 5, wherein said thrust head member is guided along guides in the table top which are diagonal with respect to the fore-and-aft direction of feed of the work to impart a lateral pressure of the work against a fore-and-aft uni-lateral guide rail for the work extending from the hopper to the conveyor.

8. Apparatus as claimed in claim 5, wherein said heads are disposed diagonally relative to their arms to present leading edges to engage the work.

9. Apparatus as claimed in claim 8, wherein the head engaging the work on the thrust head is pivoted and spring loaded to have a pawl action against the work.

10. In a bookbinding machine in which workpieces, each in the form of a bundle of sheets to be bound into a book, are fed to a binding, gluing, lining or other treatment station appropriate to book binding, a table, a work receiving surface portion on such table on to which the work pieces are fed in succession, a work conveyor with the table spaced in advance of the said work receiving portion and towards and into engagement with which the work pieces are fed so as to be received by the conveyor in succession, a fixed longitudinal abutment member disposed close alongside one longitudinal side of the table, a work engaging abutment, means to reciprocate said work engaging abutment towards and away from said longitudinal abutment, said reciprocating abutment being positioned to traverse transversely across the upper surface of the thrust head member in advance of the said work receiving surface portion of the table to engage in succession one side of the successive books as they are pushed along the table towards the conveyor to press the books against said longitudinal abutment member, a work squaring gauge member disposed close to the table top opposite the work receiving end of said conveyor and in advance of the work engaging abutment, means to actuate said work squaring member towards and away from the said abutment wall member in timed sequence with the movements of said work engaging abutment so that the work squaring member squares the books against said abutment wall member in close proximity to said work conveyor, said work squaring member and the said abutment comprising a pair of arms extending across the top of the table, a head carried at one end of each arm to engage the work, supports for said arms connected to the said means for displacing the work squaring member and displaceable abutment, means to adjust said arms lengthwise relatively to said supports to allow for different widths of work, and means to fix the arms to the selected effective lengths.

LIONEL JOHN BRYANT RUSHENT FRENCH.

References Cited in the file of this patent

UNITED STATES PATENTS

| Number | Name | Date |
| --- | --- | --- |
| 487,513 | Briggs | Dec. 6, 1892 |
| 538,403 | Belknap | Apr. 30, 1895 |
| 1,058,868 | Kepple et al. | Apr. 15, 1913 |
| 1,674,319 | Cranston | June 19, 1928 |
| 1,731,834 | Wheeler | Oct. 15, 1929 |
| 1,984,981 | Neff | Dec. 18, 1934 |
| 2,109,208 | Crighton | Feb. 22, 1938 |